June 23, 1936.  H. D. STEVENS  2,045,534
TIRE BUILDING APPARATUS
Filed April 12, 1934    5 Sheets-Sheet 1

INVENTOR
Horace D. Stevens
BY Ely & Barrow
ATTORNEYS

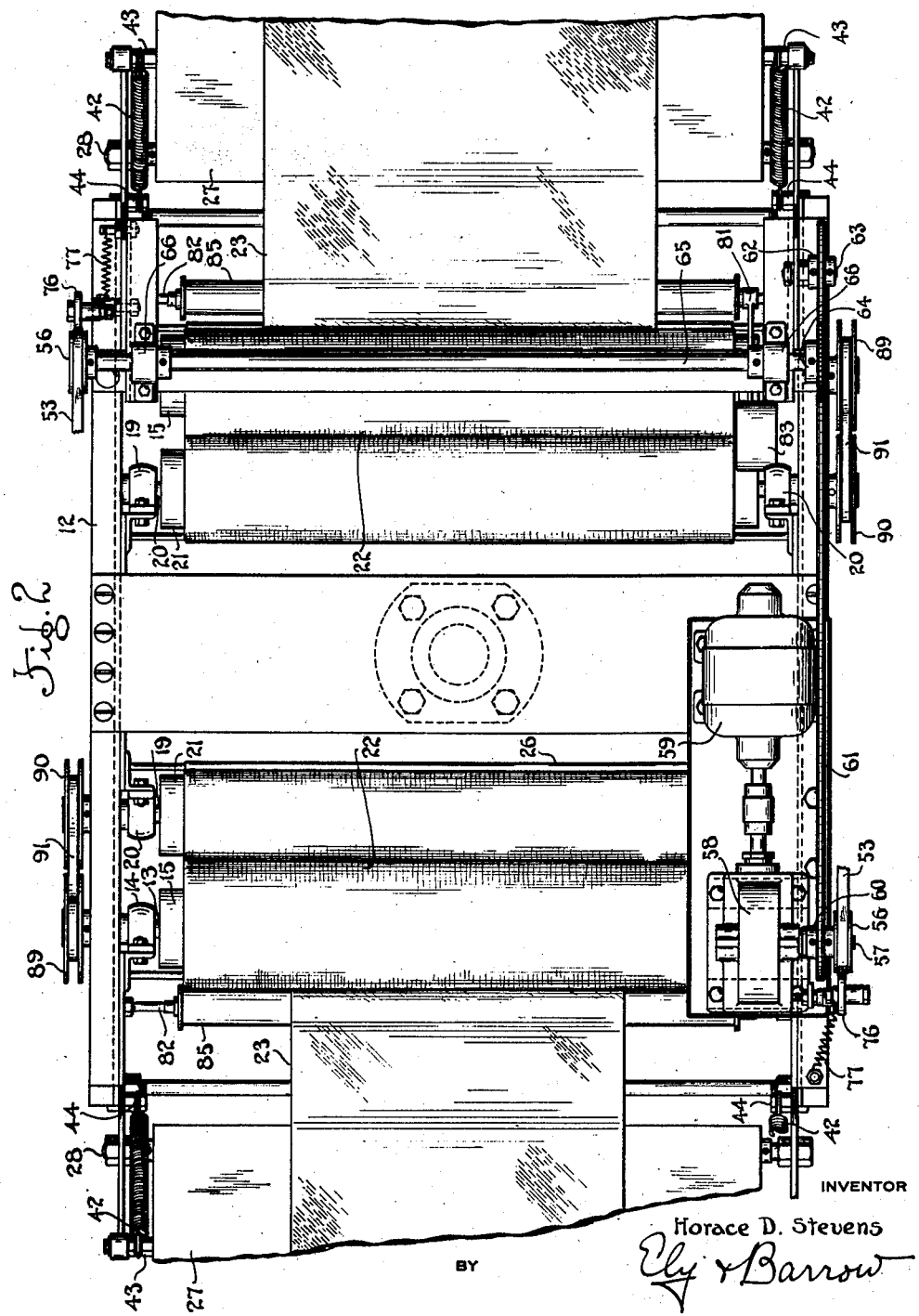

June 23, 1936.  H. D. STEVENS  2,045,534
TIRE BUILDING APPARATUS
Filed April 12, 1934   5 Sheets-Sheet 3
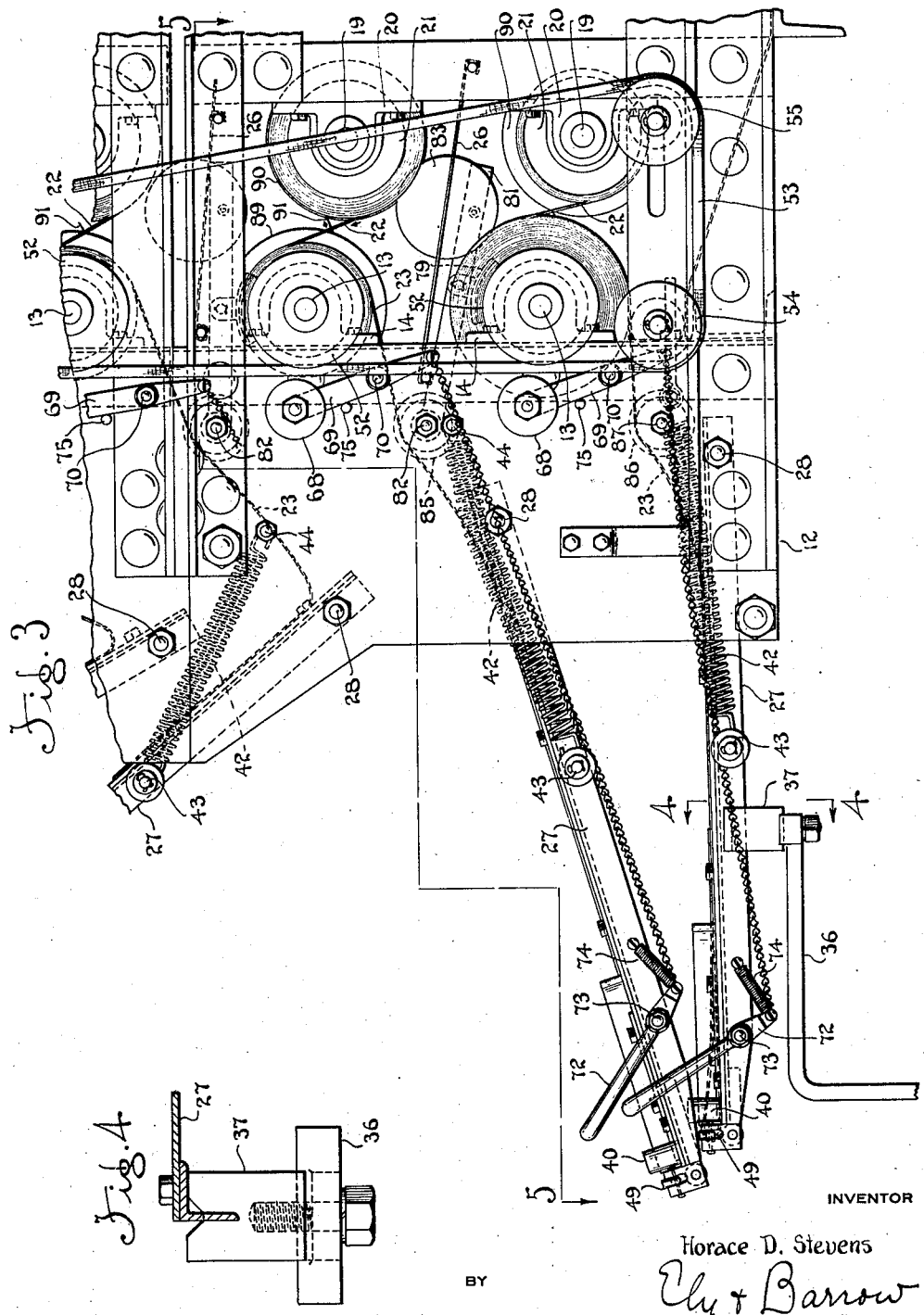
INVENTOR
Horace D. Stevens
BY Ely & Barrow
ATTORNEYS

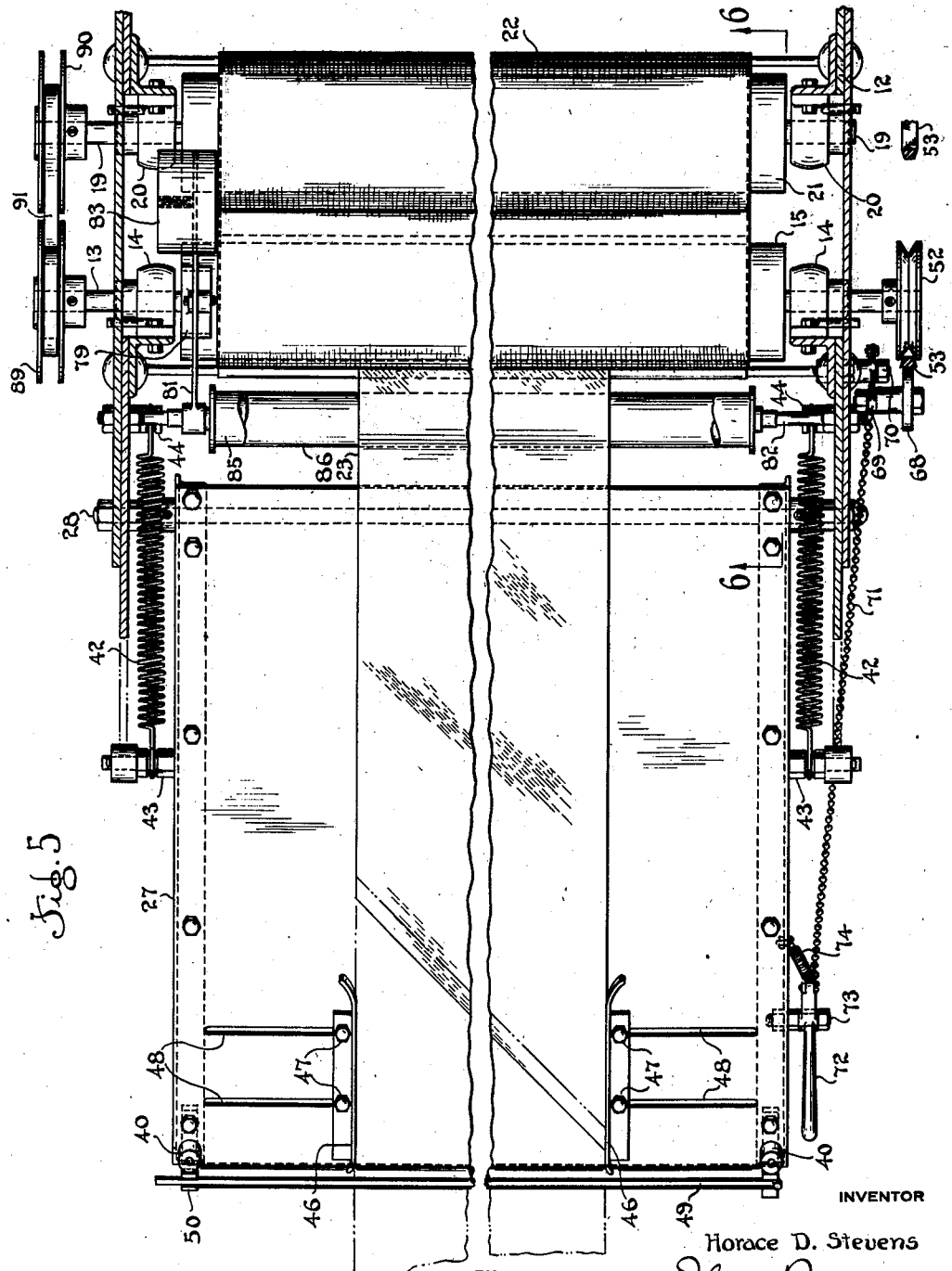

Patented June 23, 1936

2,045,534

UNITED STATES PATENT OFFICE 2,045,534

TIRE BUILDING APPARATUS

Horace D. Stevens, Akron, Ohio, assignor to The Firestone Tire & Rubber Company, Akron, Ohio, a corporation of Ohio Application April 12, 1934, Serial No. 720,229

13 Claims. (Cl. 154—10)

This invention relates to tire building apparatus, and more especially it relates to apparatus for storing determinate quantities of tire building material in proximity to a tire building form so as to be withdrawn by the latter during the fabrication of a pneumatic tire casing.

In some of its aspects the invention is an improvement upon previously employed apparatus in which the different strips of tire building fabric were arranged in festoons, the fabric being withdrawn from the festoons at one end of the apparatus and replenished at the other end thereof. Such apparatus was considerably complicated when a large number of different kinds of fabric was required, and the fabric in the festoons frequently stretched and altered the angle of its strands due to its own weight and the weight of guide rollers employed in the festoons.

The chief objects of this invention are to provide, in an improved manner, for the storage of tire building material adjacent a tire building machine; to avoid stretching of the tire building fabric; to provide facilities for the wrapping of the tire building fabric in a liner, and for readily withdrawing it therefrom; to provide simple and easily operated power mechanism for driving the liner and fabric rolls; to provide means for keeping the liner taut at all times; and to conserve floor space required for apparatus of the character mentioned. Other objects will be mainifest.

Of the accompanying drawings,

Figure 2 is a plan view thereof, on a larger scale, parts being broken away;

Figure 3 is a detail side elevation of a portion of the apparatus;

Figure 4 is a section on the line 4—4 of Figure 3;

Figure 5 is a section on the line 5—5 of Figure 3; and

Figure 1:
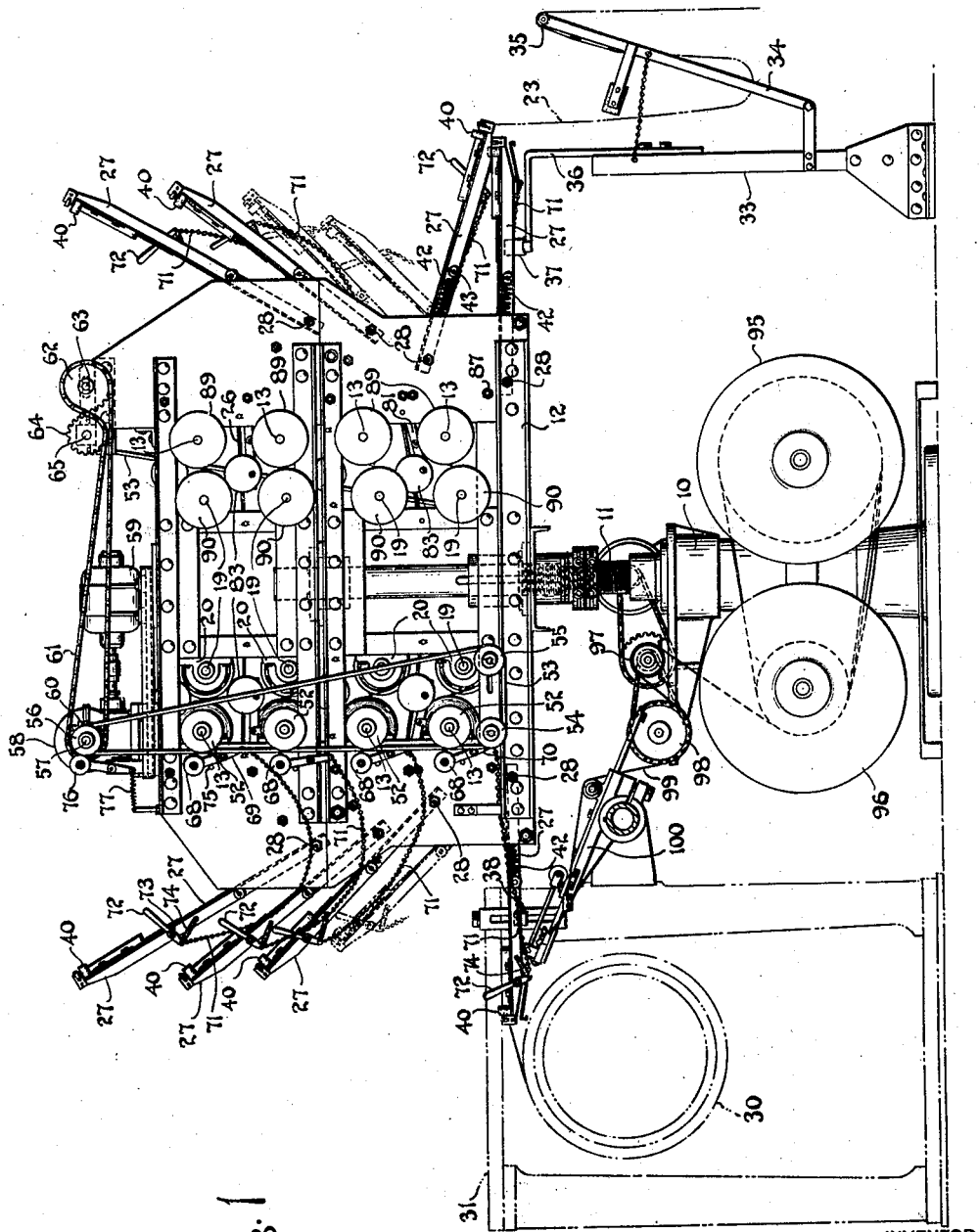
Figure 1 is a side elevation of apparatus embodying the invention, in its preferred form.

Referring to the drawings, 10 is a pedestal base, and rising therefrom is a vertically adjustable post or spindle 11 upon which is rotatably mounted a turret comprising an open framework 12. At each end of the framework 12 is a vertical series of parallel, horizontal shafts 13, 13 that are journaled adjacent their respective ends in brackets 14, 14 that are mounted upon the said framework, each of said shafts carrying a roller 15 upon which a strip of tire building fabric and liner may be wound. As shown in the drawings, there are four rollers 15 at each end of the framework, whereby the apparatus is adapted for the manufacture of 8-ply tires, but the number of such rollers may be more or less as desired.

Disposed laterally of each shaft 13, nearer the center of the turret, is a horizontal shaft 19 that is journaled adjacent its ends in brackets 20 mounted on framework 12, the shafts 19 being parallel to shafts 13 and carrying respective liner rewind rollers 21. Attached at one end to the rollers 21 are respective liners 22 that have their other ends attached to respective associated rollers 15, the arrangement being such that said liners may be wound upon the rewind rollers 21, or they may be wound, with lengths of tire building fabric 23, upon the rollers 15. The liners 22 are of such length that they may be interwound with tire building fabric of a length sufficient for two tire plies. There is also a short leader (not shown) of ordinary fabric attached to the roller 15, one end of the fabric strip 23 being adhesively attached to said leader. The liners 22 extend from the bottom of rollers 21 to the top of rollers 15, and the fabric 23 is fed onto and withdrawn from the bottoms of rollers 15, the arrangement being such that the rollers 15 and 21 always rotate in opposite directions. Baffles or guard plates 26, 26 may be positioned between each pair of rollers 15, 21 of each vertical series to prevent contact of tire stock or liner of one pair of rollers with that of the subjacent rollers in the event said stock or liner should sag.

For guiding the fabric strips 23 to and from the rollers 15, respective trays 27 are provided, said trays being pivotally mounted at 28, 28 on the framework 12 of the turret and projecting from each end thereof. The trays have an elevated, inoperative position and a lowered, operative position. In the latter position the trays at one end of the turret, the left end as viewed in Figure 1, have their free ends disposed adjacent the rotatable tire building form or drum 30 of a tire building machine 31, whereby the fabric strips 23 may be withdrawn from their rollers 15 by rotation of the drum after their leading ends have been attached thereto. At the other end of the turret the lowered trays are in convenient position for an operator to mount the strips 23 thereon and splice one end of the strips to the projecting ends of strips already on the rollers 15, or to the leaders on said rollers. For the convenience of the operator, there is provided a small frame 33 having pivoted arms 34 that carry a small roller 35 over which a strip 23 may be draped as shown, to support it during the splicing operation. The frame 33 is provided on one side with a bracket 36, the free end of which carries a slotted block 37 that will receive a marginal portion of the lowermost tray 27 when the turret is properly angularly positioned for operation and will support said tray substantially in horizontal position. A similar slotted block 38 is mounted on the tire building machine 31 in position to engage the lowermost tray 27 at that end of the turret, and support said tray in proper position with relation to the drum 30.

The arrangement is such that tire building fabric may be fed into the apparatus and withdrawn therefrom at both ends, and these operations may be concurrent. The turret may be rotated to bring either end thereof into proximity with the the tire building machine, and the feature of locking the turret at each end thereof against rotation prevents the tire builder or the operator at the other end of the turret from rotating it unless conditions at the opposite end of the turret are favorable for rotation. In operative position, the superposed trays 27 have their free ends supported by the underlying trays, and each tray carries a pair of rubber bumpers 40, 40 upon which the tray above may rest, as shown in Figures 1 and 3.

The respective trays 27 are yieldingly held in elevated, inoperative position by tension springs 42, 42 at each side thereof, each spring being connected at one end to a laterally projecting stud 43 on the tray and at its other end to a stud 44 projecting from the framework 12. The studs 44 are so positioned that in the operative position of the trays the springs 42 are substantially parallel to their respective trays and thus exert but little upward pull. Thus the weight of the trays is sufficient to hold them in lowered, operative position, yet they are easily lifted to inoperative position whereat they are retained by the springs.

As shown in Figure 5, the top of each tray 27 is provided with a pair of spaced-apart guide rails 46, 46 that are laterally adjustable by means of bolts 47, 47 that extend through respective slots 48 formed in the tray. The guide rails 46 are adapted to engage the lateral margins of strips 23 to guide the latter to and from the rollers 15. At its free end each tray 27 is provided with a rod 49 that is pivotally mounted at one side of the tray and releasably retained in a clip 50, Figure 5, at the opposite side of the tray. The strip 23 extends under the rod 49, and the exposed end of the strip may be looped over the rod and adhesively attached to itself, as shown in dotted lines on the lowermost tray in Figure 3, whereby the rod constitutes an anchorage for the strip and retains it in place on the tray when the latter is in inoperative position.

For driving the rollers 15 to wind the strips 23 and liners 22 thereon, each roller shaft 13 has one of its ends provided with a grooved pulley 52, the pulleys for the shafts 13 at one end of the turret being on the opposite side of the turret from the pulleys on the shafts at the other end thereof. Respective endless V-shaped, transmission belts 53, 53 are provided for driving the respective vertical series of pulleys 52, each of said belts being trained about two idler sheaves 54, 55, and a driving pulley 56. Each driving belt extends in a straight vertical reach from its pulley 56 to sheave 54, in proximity to but not in engagement with pulleys 52.

At one end of the turret, the left as viewed in Figures 1 and 2, the pulley 56 is mounted upon the shaft 57 of a reduction gear device 58 that is mounted upon the top of the framework 12 and driven by a motor 59. Also mounted upon shaft 57 is a sprocket 60 that is connected by a sprocket chain 61 with an idler sprocket 62 that is journaled upon an adjustable stub shaft 63 projecting laterally from the framework 12 at the opposite end of the turret. Engaged with the upper reach of chain 61 between sprockets 60, 62 is a sprocket 64 that is mounted upon one end of a shaft 65, the latter being journaled in bearing brackets 66, 66 on the top of the framework 12. The shaft 63 extends transversely of the said framework and on its opposite end carries the other pulley 56. The arrangement is such that both pulleys 56 and belts 53 are constantly driven during the operation of the apparatus.

For driving the rollers 15 selectively by means of the transmission belts 53, each pulley 52 has associated therewith a presser roller 68 that is journaled upon one end of a lever arm 69 that is pivoted at 70 on the framework 12. The other end of said lever arm 69 is connected by a chain or cable 71 to one end of an operating lever 72 that is pivotally mounted at 73 on the tray 27 that is associated with the particular roller 15. A tension spring 74 is so connected to the operating lever 72 and tray 27 as to maintain the chain 71 in loose condition even when the tray is in its lowered operating position. A positive stop 75 is provided for each lever arm 69 against which said lever arm rests when its presser roller 68 is not engaging the transmission belt. A presser roller 76 is associated with each driving pulley 56 and normally is urged against the belt 53 by a tension spring 77 whereby the belt is held in good driving engagement with said driving pulley and prevented from jumping out of the same.

The arrangement is such that the presser rollers 68 normally are disposed in slightly spaced relation to the belts 53, as shown, but may be urged against said belts to put the latter in frictional driving engagement with the pulleys 52 by tilting operating levers 72 against the tension of their springs 74. Thus the rollers 15 may be selectively driven in the direction to wind fabric strips 23 and liner 22 thereon.

To prevent coasting of the rollers 15 when the belt 53 is released from driving engagement with their pulleys 52, braking means is provided for the respective rollers. Each of said braking means comprises an arcuate brake shoe 79 having a suitable brake lining 80 adapted to rest upon the exposed peripheral surface of a roller 15 at one end thereof, said brake shoe being pivotally mounted upon a brake arm 81 at an intermediate point thereof. The brake arm 81 is pivotally supported at one end upon a shaft 82 that extends transversely of the framework 12 and is supported in the opposite side-members thereof. A counterweight 83 is mounted upon the free end of brake arm 81, the arrangement being such that the brake shoe 79 constantly is pressed against the roller 15.

Journaled upon each shaft 82, except the two at the top of the turret, is a flanged guide roller 85 for supporting a fabric strip 23 between its roller 15 and tray 27. Similar guide rollers 86 journaled on respective shafts 87 are provided at the bottom of the turret for fabric strips from the respective lowermost rollers 15 at opposite ends of the turret.

The brakes 79 also serve to maintain the fabric strips 23 in taut condition as they are withdrawn from their rollers 15 and wound about the drum 30 of the tire building machine 31, and prevent over-run of the said rollers when the out-feed of the strips ceases. During the withdrawal of the strips 23 from the rollers 15, the liner 22 that is interwound with each of said strips is concurrently and automatically rewound upon its respective liner rewind roller 21. To this end the shafts 13 have respective flanged pulleys 89 mounted upon the opposite ends thereof from the pulleys 52, and the adjacent ends of the shafts 19 have similar flanged pulleys 90 mounted thereon. Mounted upon each pulley 89 is a coiled torsion spring 91 composed of flat metal tape, one end of spring 91 being secured to the pulley 89 at 92 and the other end of said spring being secured to pulley 90 at 93, Figure 6. The spring 91 is so arranged that it passes over pulley 90 and under pulley 89, and thus is disposed transversely with relation to the liner 22 that extends from roller 21 to roller 15. When a roller 15 is empty of fabric 23, the major portion of spring 91 is on pulley 89 with four or five convolutions thereof about pulley 90, as is most clearly shown with relation to the uppermost unit in Figure 6.

Figure 6:
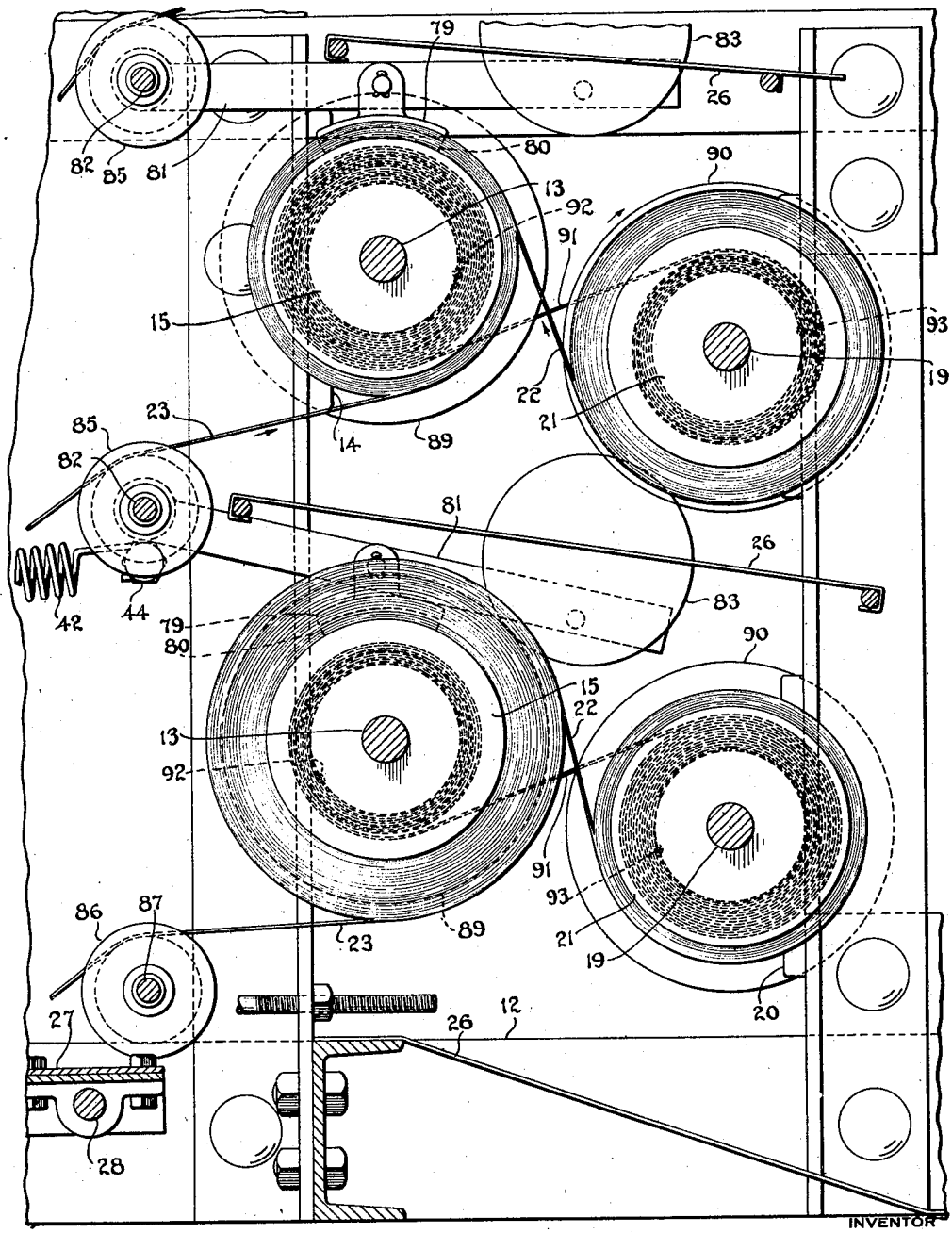
Figure 6 is a section on the line 6—6 of Figure 5.

When a roller 15 is driven to wind fabric 23 and liner 22 thereon, it rotates in counter-clockwise direction as viewed in Figure 6, the said liner being drawn off the roller 21 and rotating the latter in clockwise direction. The aforesaid movement of rollers 15, 21 serves to pay out the spring 91 from pulley 89 and wind it upon pulley 90. When rotation of rollers 15, 21 ceases, the expansive force of the spring 91 acting through pulley 90 and shaft 19 urges the roller 21 in a counter-clockwise direction whereby the liner 22 is kept in taut condition, the brake 79 preventing the spring from turning roller 15. This condition is shown in the lower unit of Figure 6.

When a fabric strip 23 is pulled to withdraw it from its roller 15, it rotates the latter in clockwise direction as viewed in Figure 6, and pays out the liner 22. This permits the spring 91 to rotate the roller 21 in a counter-clockwise direction and thus to roll up the liner 22 thereon as fast as it comes off roller 15, the spring maintaining a constant tension on the liner. Rotation of roller 15 also rewinds spring 91 onto pulley 89 as fast as it is paid out of pulley 90 by the counter-clockwise rotation thereof. The liner 22 and spring 91 constitute the sole means for driving the liner rewind roller 21, and said spring keeps the liner taut at all times notwithstanding the variable amount of liner that may be on said roller. The driving of roller 21 by means of spring 91 compensates for the variation of the relative speeds of rotation of rollers 15 and 21 occasioned by the variable relative diameters of the rollers as the number of convolutions of liner and fabric is varied.

The pedestal base 10 may carry a reel 95 of sidewall stock and liner, a liner rewind reel 96, and motor-driven feed rollers 97, 98 for withdrawing the sidewall stock 99 from its reel. Suitable guiding mechanism 100 may be carried by the tire building machine 31 for guiding the strip of sidewall stock 99 to the tire building drum 30.

In the operation of the apparatus, the latter being in the position shown in Figure 1, the tire builder withdraws tire building strips 23 selectively from the various rolls thereof simply by pulling down the proper tray 27 to operative position, attaching the end of the strip 23 thereon to the drum 30, and rotating the latter to draw said strip from its roller 15 onto the drum. After the latter has made one revolution the strip is severed, and its end portion looped over rod 49.

If another ply of material is to be applied to the drum the next tray 27 is pulled down and the operation repeated. After fabric from the uppermost roller 15 has been used, all the trays at that end of the turret may be raised to inoperative position, the raising of the lower tray unlatching the turret at that end of the apparatus. If the trays at the opposite end of the apparatus are then in raised position, the turret may be rotated on its spindle 11 so that the opposite end thereof is adjacent the tire building machine, and the operations described repeated. The turret carries all the body fabric necessary to build a tire casing, and after the last ply 23 is on the tire, and the trays 23 elevated, the turret again may be rotated on its axis, this time by an operator at the opposite end of the apparatus, for the purpose of replenishing the tire building material that has been withdrawn from the apparatus.

Replenishing of the tire fabric in the apparatus requires relatively little time as compared to the time required for building a tire, so that the operator who replenishes fabric may take care of two or more of the turrets. To replenish the fabric, the operator merely pulls down successive trays to operative position, splices a strip of fabric 23 to the strip already on the respective roller 15, or to the leader thereon, and then tilts the lever 72 to cause the presser roller 68 to move the belt 53 into engagement with the respective pulley 52 to drive the roller 15 and thus to wind the strip 23 thereon together with the liner 22 from adjacent roller 21. When all rollers 15 at one end of the turret are replenished, the operator raises all the trays 27 to inoperative position, which unlatches the turret at that end thereof, so that it may be rotated by the tire builder when desired. The arrangement is such that neither operator is required to wait for the other, and the turret cannot be rotated by either operator unless conditions at the other end of the apparatus are favorable, with the result that possibility of accident to operator and apparatus is avoided.

The apparatus is of simple and compact construction, is easily operated, conserves floor space, and accomplishes the other objects set out in the foregoing statement of objects.

Modification may be resorted to without departing from the spirit of the invention or the scope of the appended claims, which are not limited wholly to the specific construction shown and described.

What is claimed is:

1. In tire building apparatus, the combination of a rotatable turret, a vertical series of parallel, horizontally disposed, fabric supply rollers thereon, a similarly arranged series of liner rewind rollers associated with the respective fabric supply rollers, power means carried by the turret for driving the fabric supply rollers in one direction, to wind fabric and liner thereon, and means for selectively engaging the fabric supply rollers with said power means.

2. In tire building apparatus, the combination of a rotatable turret, respective vertical series of parallel, horizontally disposed, fabric supply rollers mounted thereon at opposite ends thereof, similarly arranged series of liner rewind rollers associated with the respective fabric supply rollers, power means mounted on the turret for driving the fabric supply rollers at both ends of the turret in one direction to wind fabric and liner thereon, and means for driving said fabric supply rollers selectively from said power means.

3. In tire building apparatus, the combination of a rotatable turret, a plurality of fabric supply rollers mounted thereon, tiltable trays associated with the respective supply rollers, a single power member mounted on the turret for driving the supply rollers in a direction to wrap liner and fabric thereon, and means on the respective trays for engaging said power member selectively with the respective supply rollers.

4. In tire building apparatus, the combination of a supply roller for liner and fabric, a pulley on the end thereof, a transmission belt adjacent said pulley and in the plane thereof, means for driving said belt, and means for moving the belt into frictional driving engagement with said pulley.

5. In tire building apparatus, the combination of a plurality of supply rollers for tire building material, respective pulleys on the ends thereof, a transmission belt having a reach thereof disposed adjacent said pulleys in the plane thereof, means for continuously driving said transmission belt, and means for moving said belt selectively into driving engagement with the respective pulleys.

6. In tire building apparatus, the combination of a supply roller for fabric and liner, a pulley on one end thereof, a transmission belt having a reach thereof adjacent the pulley, means for driving the transmission belt, a tiltable tray mounted adjacent the roller for guiding fabric thereto, and means on the tray for moving the transmission belt into driving engagement with the pulley.

7. In tire building apparatus, the combination of a supply roller for fabric and liner, a pulley on one end thereof, a transmission belt having a reach disposed adjacent the pulley in the plane thereof, means for continuously driving the transmission belt, a presser roller mounted for movement in its own plane so as to engage the transmission belt and move it into driving engagement with said pulley, and manually controlled means for so moving said presser roller.

8. In tire building apparatus, the combination of a supply roller for fabric and liner, a pulley on one end thereof, a transmission belt having a reach disposed adjacent the pulley in the plane thereof, means for continuously driving said transmission belt, a presser roller disposed in the plane of the pulley, a pivotally mounted arm carrying said presser roller, and manually controlled means for swinging said arm to move the presser roller against the transmission belt whereby the latter is moved into driving engagement with the pulley.

9. In tire building apparatus, the combination of a plurality of supply rollers of fabric and liner, respective pulleys on the ends thereof, a transmission belt having a reach disposed adjacent said pulleys in the plane thereof, means for driving said belt, presser rollers associated with the respective pulleys and disposed in the respective planes of the latter, pivotally mounted arms carrying the respective presser rollers, respective tiltable trays associated with the supply roller for guiding stock thereto, and means on each tray for swinging a presser-roller-arm so as to cause its presser roller to force the belt into engagement with a pulley.

10. In tire building apparatus, the combination of a supply roller for fabric and liner, a tiltable tray adjacent said roller for guiding fabric thereto, said tray having alternative operative and inoperative positions, a pulley on one end of said supply roller, means normally disengaged therefrom for driving said pulley, and means on said tray for causing said driving means to engage said pulley, said last-mentioned means being inoperative in the inoperative position of the tray.

11. In tire building apparatus, the combination of a supply roller for fabric and liner, a tiltable tray adjacent said roller for guiding fabric thereto, a pulley on one end of said roller, a transmission belt adjacent said pulley and in the plane thereof, a presser roller disposed in the plane of the pulley, a pivoted arm on which said presser roller is mounted, and means comprising a flexible connection from said tray to said arm for manually swinging the latter to cause the presser roller to engage the transmission belt.

12. In tire building apparatus, the combination of a rotatable turret, supply rollers for tire building material mounted thereon at opposite ends thereof, tiltable trays on the turret associated with the respective supply rollers for guiding material thereto, said trays having operative and inoperative positions, and means located at fixed points adjacent the turret and engageable with the trays at opposite ends thereof to prevent rotation of the turret when a tray at either end of the turret is in operative position.

13. In tire building apparatus, the combination of a rotatable turret, supply rollers for tire building material mounted thereon at opposite ends thereof, tiltable trays on the turret having operative and inoperative positions, said trays being associated with respective supply rollers for guiding material thereto, and means for preventing rotation of the turret when a tray at either end of the turret is in operative position.

HORACE D. STEVENS.